May 12, 1953     A. A. KLEBBA     2,637,999
MARINE WAVE METER
Filed April 10, 1946
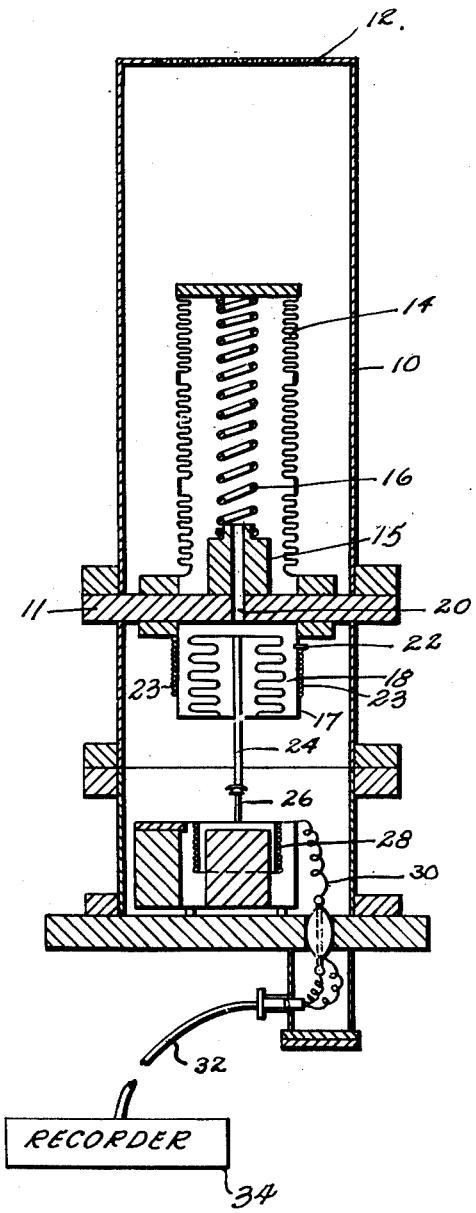
Inventor:
Arthur A. Klebba
M. C. Hayes
Attorney

Patented May 12, 1953

2,637,999

UNITED STATES PATENT OFFICE 2,637,999

MARINE WAVE METER

Arthur A. Klebba, Woods Hole, Mass., assignor to United States of America, as represented by the Secretary of the Navy Application April 10, 1946, Serial No. 660,867

2 Claims. (Cl. 73—301)

This invention relates to a wave meter. More particularly, the invention is concerned with a shore recording wave meter which measures change in pressure levels at the bottom of the sea, to furnish means for determining the occurrence of waves and their characteristics.

Information regarding the condition of the surface of the sea at various distances from an observation point on shore is frequently desirable. For example, in determining whether a seaplane can land in the sea at a given point, it is very desirable to know approximately the height of the waves occurring in this particular area as well as the spacing of the waves. Various other situations suggest themselves where data of this type are helpful.

An object of the invention therefore is to provide a metering device to be mounted on the shore for detecting surface changes in sea water, in order to obtain an indication of wave occurrence in a given area at some distance from the shore.

A further object of the invention is to provide a device that will measure the fluctuating component of a pressure without responding to relatively slow changes in the magnitude of the pressure. Other objects and novel features will appear from the following description.

In the accompanying drawing the sole figure is a longitudinal cross-sectional view illustrating a preferred embodiment of the invention.

The structure shown in the drawing constitutes one suitable means for accomplishing the objects of the invention and includes in general a bellows member which is responsive to fluctuations in sea water pressure resulting from the action of the waves. The bellows moves a coil which passes through a magnetic field cutting lines of flux. The voltage thus generated is utilized to operate a fluxmeter galvanometer. The action of the fluxmeter galvanometer is recorded on a photographic tape member, thus producing a graphic illustration of pressure changes. The pressure changes are calibrated with known pressure pulses in the order of magnitude of those to be measured under sea conditions, thus furnishing a basis for closely estimating the height and spacing of waves in a desired locality.

Numeral 10 denotes a cylindrical member separated by a panel 11 into an upper section and a lower section. The top cylinder is formed with openings 12 through which sea water is allowed to enter into the upper section. A bellows member 14 is also mounted in the upper section of the cylindrical member 10 and is responsive to movement of the sea water, opening and closing with changes in pressure. A spring member 16, mounted on a block 15, tends to maintain the bellows in an erect position and provide the proper displacement of the bellows. An inner cylindrical member 17, closed at one end and joining panel 11 in an airtight seal at its open end, communicates with bellows 14 by a channel 20 passing through panel 11 and block 15. A second bellows 18 is disposed within cylindrical member 17. The open end of bellows 18 is joined to the closed end of member 17 in an airtight seal. The second bellows member 18 forms a closed air space and moves in accordance with pressure on the bellows 14. An opening 22 through cylindrical member 17 provides for a slow leak so that air can equalize in pressure on both sides of the bellows 18. The slow leak for pressure equalization may be accomplished by means of a capillary tube 23 shown coiled around cylindrical member 17. One end of capillary tube communicates with the interior of cylindrical member 17 through opening 22, and the other end communicates with the space surrounding member 17. The pressure within bellows 18 is equal to the pressure outside cylindrical member 17, since shaft 24 does not make an airtight fit with the end of cylindrical member 17. Equalization is desirable to compensate for tide change and installation of the instrument on the ocean bottom.

Movement of the bellows 18 in a vertical direction, as viewed in the drawing, actuates a rod member 24 which in turn drives a pin 26 and moves a coil 28 in a magnetic field. The voltage thus induced is carried through conductor 30 through a cable 32 to a shore recording unit consisting of a fluxmeter galvanometer 34. The galvanometer is preferably combined with a photographic tape unit of well known character, by means of which there is produced a continuous recording of pressure change from which suitable deductions may be made. It is to be understood that a suitable voltmeter may be substituted for the recording unit 34 if desired. However, since the voltage induced in coil 28 is fluctuating, the data represented by this voltage may be more accurately interpreted if a record of the fluctuation is made by a suitable recording unit.

An important feature of the device is the construction of a relatively large gas-filled bellows surrounded by liquid, and a relatively small gas-filled bellows surrounded by gas. The bellows 18 moves a distance proportionate to that through which the larger bellows moves, thus adapting movement of the larger bellows to the limitations of the magnetic field. Moreover, relatively slow fluctuations in pressure of less importance are leveled off by means of the outlet 22 and the equalization thus provided for. As a result, some degree of selectivity is developed which indicates the occurrence of waves of appreciable magnitude.

While I have shown a preferred embodiment of my invention, it should be understood that various changes and modifications may be resorted to, in keeping with the scope of the invention as defined by the appended claims.

I claim:

1. Apparatus for measuring relatively rapid fluctuations in the height of a fluid column comprising, a plate having a central aperture formed therein, a first resilient bellows having one open end and one closed end, the open end of said first bellows being joined to said plate at one side thereof in a fluid tight seal in a position to surround said aperture, a first cup-like member having the open end thereof joined to the other side of said plate in a fluid tight seal in a region surrounding said aperture, a second cup-like member of greater size than said first surrounding said first cup-like member and having the open end thereof secured to said plate in a fluid tight seal, a second resilient bellows disposed within said first cup-like member and having an open end secured to the bottom of said first cup-like member in a fluid tight seal, said first cup-like member being formed with an opening in the bottom thereof providing free communication between the interior of said second bellows and the interior of said second cup-like member, means formed with a restricted passage connecting the interior of said first cup-like member to the interior of said second cup-like member, means responsive to movement of said second bellows for generating an electrical signal and a cable passing through said second cup-like member in a liquid tight seal for coupling said electrical signal to an indicator.

2. Apparatus for measuring relatively rapid fluctuations in the height of a variable height fluid column comprising a first resilient bellows capable of responding to changes in pressure at all heights of said fluid column, a supporting plate sealing an open end of said first bellows, a cup-like member having the open end thereof joined to said plate opposite said first bellows, said plate being formed with an aperture therein providing free communication between said first bellows and the interior of said cup-like member, a second bellows having an open end thereof joined to the bottom of said cup-like member, said second bellows being capable of responding to all rapid fluctuations in pressure within said cup-like member, said second bellows having a normal volume small compared to the maximum volume of said first bellows, an enclosing means surrounding said cup-like member and joined to said supporting plate to form a fluid tight chamber, said cup-like member being formed with an opening in the bottom thereof providing free communication between the interior of said second bellows and said fluid tight chamber, a capillary tube connecting the interior of the cup-like member to said fluid tight chamber thereby to provide for slow equalization of pressure on the interior and exterior of said second bellows, means responsive to movement of said second bellows for generating an electrical signal and a cable passing through said enclosing means in a fluid tight seal for coupling said electrical signal to an indicator.

ARTHUR A. KLEBBA.

References Cited in the file of this patent

UNITED STATES PATENTS

| Number | Name | Date |
|---|---|---|
| 1,929,091 | Colvin | Oct. 3, 1933 |
| 2,059,549 | Carlson | Nov. 3, 1936 |
| 2,139,509 | Marcellus | Dec. 6, 1938 |
| 2,140,954 | Frazee | Dec. 20, 1938 |
| 2,164,791 | Waller | July 4, 1939 |
| 2,466,071 | Barnes, Jr., et al. | Apr. 5, 1949 |

FOREIGN PATENTS

| Number | Country | Date |
|---|---|---|
| 559,149 | Great Britain | Feb. 7, 1944 |

OTHER REFERENCES

Article by Holter in publication "Electronics," pages 94–98, May 1946 issue.